Figure 2:
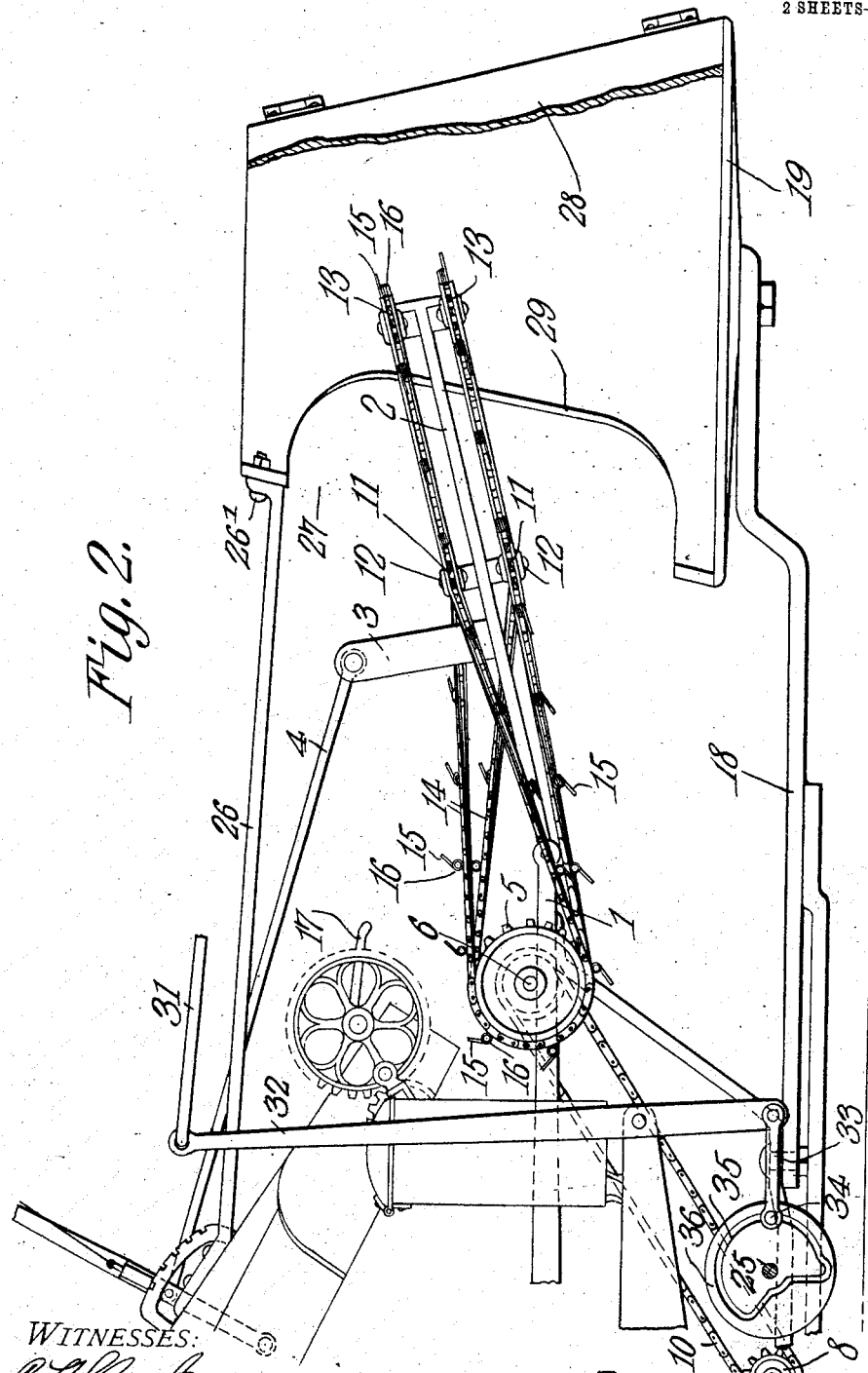

No. 866,101. PATENTED SEPT. 17, 1907.
H. H. WATT.
GRAIN SHOCKER FOR HARVESTERS.
APPLICATION FILED FEB. 18, 1907.
2 SHEETS—SHEET 1.
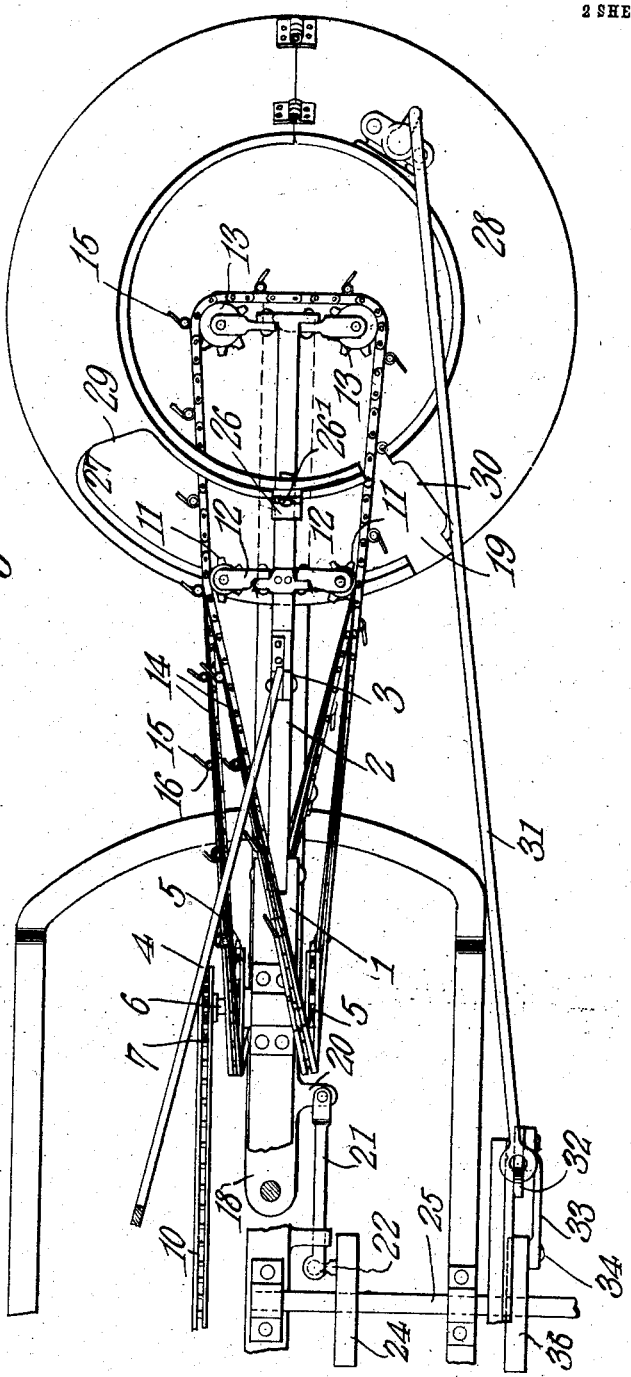
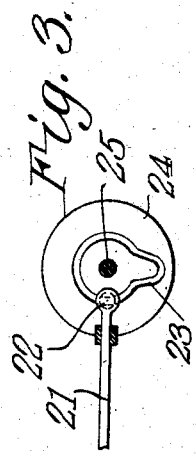
WITNESSES:
Herbert H. Watt.
INVENTOR.
By C. A. Snow & Co.
ATTORNEYS No. 866,101. PATENTED SEPT. 17, 1907.
H. H. WATT.
GRAIN SHOCKER FOR HARVESTERS.
APPLICATION FILED FEB. 18, 1907.

2 SHEETS—SHEET 2.

WITNESSES:
E. W. Stewart
C. Bradway.

Herbert H. Watt,
INVENTOR.

By C. A. Snow & Co.
ATTORNEYS

UNITED STATES PATENT OFFICE.

HERBERT HUGH WATT, OF ST. THOMAS, NORTH DAKOTA, ASSIGNOR OF ONE-HALF TO WILLIAM R. A. BALL, OF ST. THOMAS, NORTH DAKOTA.

GRAIN-SHOCKER FOR HARVESTERS.

No. 866,101.　　　　　Specification of Letters Patent.　　　　　Patented Sept. 17, 1907.

Application filed February 18, 1907. Serial No. 357,982.

*To all whom it may concern:*

Be it known that I, HERBERT HUGH WATT, a citizen of the United States, residing at St. Thomas, in the county of Pembina and State of North Dakota, have invented a new and useful Grain-Shocker for Harvesters, of which the following is a specification.

This invention has relation to grain shockers for harvesters and it consists in the novel construction and arrangement of its parts as hereinafter shown and described.

The object of the invention is to provide a means for assembling and collecting bundles of grain as they are tied by the mechanism of the harvester and confine the said bundles until a sufficient number has been collected when the said bundles are lowered into position upon the ground in the form of a shock.

The device consists primarily of a series of sprocket chains having spring fingers which are adapted to engage the bundles and convey them to a receptacle. Means is provided for varying the altitude at which the said chains shall travel, thereby, rendering the device applicable to tall or short grain. The said receptacle is provided with a removable bottom which is swung out of the way when the shock is about to be deposited upon the ground. The said receptacle is also provided with a hinged side or section having means for swinging the same open for dropping the shock. Said means will also hold the sectional side of the receptacle in closed position sufficiently tight to bind bundles therein even though the bottom of the receptacle is swung out of the way. Consequently the said bottom may first be moved and the side section subsequently opened for dropping the shock.

In the accompanying drawing:—Figure 1 is a top plan view of the shocker. Fig. 2 is a side elevation of the same with parts broken away, and Fig. 3 is a side elevation of one of the disks provided with an eccentric groove.

The shocker comprises the arm 1 which is attached at its inner end to the frame of the harvester. Said arm is provided with an outer hinged portion 2 which is arranged to swing vertically. The said hinged portion 2 is provided with an upstanding lug 3 to the end of which is attached a draw rod 4. The free end of said rod 4 lies in the vicinity of the operator's seat, not shown, and the said rod is adapted to be moved manually. The sprocket wheels 5 are fixed to the shaft 6 which is journaled for rotation in the frame of the harvester. The sprocket wheel 7 is also fixed to the shaft 6, and the sprocket wheel 8 is fixed to the sickle bar shaft 9 and the sprocket chain 10, passes around the wheels 7 and 8. The sprocket wheels 11 are journaled upon spindles 12 which are hinged to the portion 2 of the arm 1. Thus the said sprocket wheels may swing in arcs in lateral directions with relation to the said portion 2. The sprocket wheels 13 are similarly mounted at the end of the portion 2 of the arm 1. The sprocket chains 14 pass around the sprocket wheels 5, and 13 and over the sprocket wheels 11. There is sufficient play between the links of the said chains 14 as to permit the same to twist laterally in passing from one of the wheels 5 to the opposite upper wheel 11 and from one of the lower wheels 11 to the opposite wheel 7. The said chains 14 are provided at intervals with the prongs or fingers 15. The base portions of said prongs are convolute as at 16 and consequently lend resiliency to the said prongs, which may bend back when delivering the bundles.

The skids 17 are attached to the deck of the harvester and are located above the wheels 5. The arm 18 is pivotally supported at its inner end upon the frame of the harvester and is provided at its outer end with a circular platform 19. Said arm is provided with a laterally extending lug 20 to the end of which is pivoted a link 21. The inner end of the link 21 is provided with a pin 22 which enters the eccentric groove 23 provided in the cam 24. Said cam is fixed upon a shaft 25 which is journaled for rotation. The said platform 19 constitutes the bottom of the bundle receptacle. The arm 26, is attached at its inner end to the frame of the harvester. The receptacle 27 is fixed to the outer end of the arm 26 by means of the bolt 26' and may be tilted laterally at any desired angle and the receptacle side-section 28 is hinged to the edge of the receptacle 27. The inner edges of the receptacle 27 and the section 28 are provided with the recessed portions 29 and 30 respectively and it is through said recesses that the outer portion of the portion 2 of the arm 1 passes into the space between the receptacle. The outer end of the rod 31 is pivotally attached to the outer side of the section 28. The inner end of the said rod 31 is pivoted to the working end of the lever 32 which in turn is fulcrumed to the frame of the harvester. The link 33 is pivotally attached at one end to the power end of the lever 32 and at its opposite end is provided with a pin 34 which enters a groove 35 provided in the disk 36. Said disk is fixed to the shaft 25 and rotates with the same.

The operation of the device is as follows:—The sprocket wheel 7 rotates continuously, consequently the sprocket chains 14 are in continuous motion. The bundles of grain pass from the deck of the harvester over the skids 17 and fall upon the chains 14. Each bundle is engaged by the prongs 15 which enter the bundle in the vicinity of the binding twine thereof. As the chains 14 move at their upper portions toward the wheels 13 the bundle is turned from a horizontal position into a vertical position and is carried with its butt end upon the platform 19 and between the side of the receptacle 27 and the section 28. When the bundle is carried around upon its end within the receptacle 27 until it comes in contact with the edge of the section 28 having the recess 30, the prongs 15 will be pressed back by the resistance of the bundle and will escape the same, leaving it in the said receptacle. The next bundle will come in contact with the preceding bundle and the operation above described is repeated until the receptacle is filled with bundles. When this occurs the link 33 is moved longitudinally by means of its engagement with the eccentric groove 35 of the cam 24. The lever 32 is swung upon its fulcrum and the rod 31 is moved toward the harvester which draws in the hinged section 28 of the bundle receptacle and the said bundles are pinched together at their upper ends and confined. When this occurs the link 21 is moved longitudinally by reason of its engagement with the eccentric groove 23 provided in the cam 24, consequently, through the lug 20 the arm 18 is swung laterally and the platform 19 is carried from under the bundle receptacle. The section 28 is then swung open by a reversal of the movement of the parts 31, 32 and 33 and thus the bundles are liberated and fall to the ground in the form of a shock. After the shock is deposited the platform 19 moves back under the bundle receptacle by a reversal of the movement of the parts 18, 20, and 21 as above described.

The hopper 27 may be of any desired shape and if necessary may be provided with a supporting wheel.

Flexible belts of rubber or leather may be substituted for the chains 14 if desired.

Having described my invention what I claim as new and desire to secure by Letters-Patent is:—

1. A shocker comprising a bundle receptacle having means for confining the bundles, a bottom for the receptacle mounted for edgewise movement in the arc of a circle and means for delivering bundles to the receptacle.

2. A shocker comprising a receptacle having means for confining bundles, a bottom for the receptacle, a pivoted arm supporting said bottom and adapted to move the bottom edgewise, a means for swinging said arm and means for delivering bundles to the receptacle.

3. A shocker comprising a bundle receptacle having means for confining and liberating bundles, a sprocket chain moving in a twisted orbit, sprocket wheels supporting said chain and bundle-engaging prongs carried by the chain, said chain entering and emerging from the bundle receptacle.

4. A shocker comprising a bundle receptacle having means for confining and releasing the bundles, a bundle conveyer comprising an arm having a hinged outer portion, sprocket wheels located at the inner and outer portions of said arm and lying in different planes, a sprocket chain passing around said wheels and having bundle engaging prongs.

5. A shocker comprising a bundle receptacle having means for confining and liberating bundles, a bundle conveyer comprising an arm, sprocket wheels journaled upon the arm and lying in different planes, a sprocket chain passing around the wheels and having bundle engaging prongs with coils at the bases of the prongs.

In testimony that I claim the foregoing as my own, I have hereto affixed my signature in the presence of two witnesses.

HERBERT HUGH WATT.

Witnesses:
A. L. MILLER,
R. A. MILLER.